Jan. 31, 1928.
C. W. DAYTON
1,657,994
DRIVING ATTACHMENT FOR AUXILIARY MECHANISM ON TRACTORS
Filed June 4, 1925
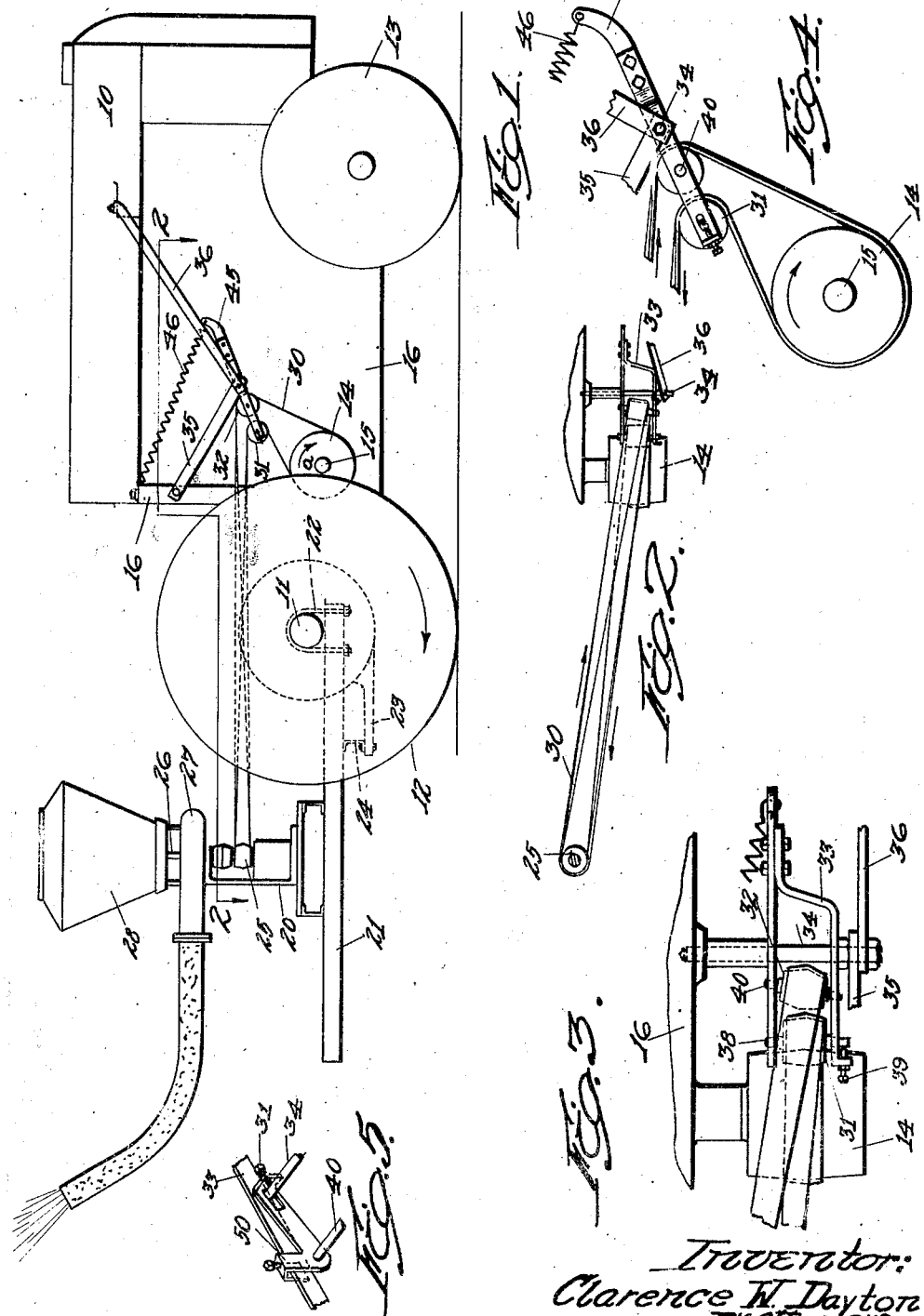
Inventor:
Clarence W. Dayton
By attorneys
Southgate Hay & Hawley Patented Jan. 31, 1928.

1,657,994

UNITED STATES PATENT OFFICE.

CLARENCE W. DAYTON, OF MILTON, NEW YORK, ASSIGNOR OF ONE-HALF TO WILLIAM A. GREENE, OF GRAFTON, MASSACHUSETTS.

DRIVING ATTACHMENT FOR AUXILIARY MECHANISM ON TRACTORS.

Application filed June 4, 1925. Serial No. 34,975.

This invention relates to a driving attachment by which auxiliary mechanism may be conveniently driven from a driving pulley such as is commonly supplied on certain types of tractors. This driving pulley is commonly located in front of the rear axle of the tractor and at or below the level thereof, while the auxiliary mechanism to be driven is desirably mounted upon a platform extending rearward from the tractor.

It is the object of my invention to provide an improved and effective belt drive between a driving pulley on a tractor and an auxiliary mechanism on a tractor, both having the general relative positions above described.

To the attainment of this object, I provide belt-guiding and tension devices of novel construction and operation, and my invention further relates to certain arrangements and combinations of parts which will be hereinafter described and more particularly pointed out in the appended claims.

A preferred form of the invention is shown in the drawings in which

Fig. 1 is a side elevation of a tractor having my invention applied thereto;

Fig. 2 is a plan view of the driving attachment, taken substantially along the line 2—2 of Fig. 1;

Fig. 3 is an enlarged partial plan view of the driving attachment;

Fig. 4 is an enlarged side elevation of the parts shown in Fig. 3, and

Fig. 5 is a detail view of a modification.

Referring to the drawings, I have indicated a tractor 10 of a usual type, having a rear axle 11 on which driving wheels 12 are mounted. The front portion of the tractor is supported upon additional wheels 13 and a pulley 14 is mounted upon a shaft 15 projecting from the side of the tractor frame 16 and between the front and rear wheels. The shaft 15 is commonly at or below the level of the rear axle 11.

A suitable clutch mechanism (not shown) is provided, by means of which the pulley 14 may be connected to the engine of the tractor whenever it is desired to rotate the pulley to supply power for any desired purpose. The parts thus far described are of the usual construction and in themselves form no part of my present invention.

It is frequently desirable to operate some kind of auxiliary mechanism from the driving pulley 14. In Fig. 1, I have indicated the auxiliary mechanism as comprising a machine 20 for dusting fruit trees by blowing a suitable fine powder against the foliage of the tree. This machine 20 is shown as mounted upon a platform 21 projecting rearward from the tractor and clamped to the rear axle casing by U-shaped members 22. The tractor is also provided with a rearwardly projecting bracket or frame member 23 having a cross bar or spacing member 24 mounted thereon and forming an additional support for the platform 21.

It will be understood that the particular means for supporting the auxiliary mechanism 20 upon the tractor may be widely varied to suit operating conditions. The machine 20 is shown as provided with a driven pulley 25 preferably mounted on a vertical shaft 26 rotatable in suitable bearings in the machine 20 and extending upward into a fan chamber 27 and hopper 28.

My invention relates particularly to the provision of improved driving connections between the driving pulley 14 and the driven pulley 25. For this purpose I provide an endless belt 30 and a pair of guide pulleys 31 and 32. These pulleys 31 and 32 are mounted in a forked frame 33 which is pivoted upon a stud 34 fixed in the frame 16 of the tractor. Braces 35 and 36 may be provided for more firmly supporting the outer end of the stud 34.

The lower or rearmost guide pulley 31 is rotatable upon a short shaft 38 mounted in the end portions of the frame 33 and having its axis substantially parallel to the axis of the driving shaft 15 and to the axis of the rear axle 11. An adjusting screw 39 (Fig. 3) may be provided for producing slight changes in the angular relation of the shaft 38 to the shaft 15.

The upper or forward guide pulley 32 is mounted upon a short shaft 40 which is secured to an inclined relation in the frame 33, as clearly shown in Fig. 3. The axis of the shaft 40 should be substantially perpendicular to a line joining the center of the face of the guide pulley 32 to the center of the face of the driven pulley 25 at the point where the belt 30 leaves the pulley 25.

The frame 33 is extended forward and upward beyond its pivot, as indicated at 45, and is provided with a tension spring 46 connected to a fixed point on the tractor frame 16.

Having described the details of construction of my improved driving attachment, the operation thereof is as follows: The pulley 14 rotates in the direction of the arrow *a* in Fig. 1 and the belt 30 is drawn directly from the driven pulley 25 to the upper, forward, guide pulley 32, as indicated in Fig. 2, from which guide pulley the belt passes in a direct line to the face of the driving pulley 14. From the pulley 14 the belt passes directly to the lower, rear, guide pulley 31 and leaves the pulley 31 substantially in the plane of the driving pulley 25, to which it then passes.

The spring 46 tends to swing the frame 33 about its pivot 34, thus simultaneously applying tension to both the upper and lower runs of the belt 30.

The belt is first guided forwardly and upwardly from the driving pulley 14 and then extends rearward to the auxiliary mechanism in substantially horizontal and closely adjacent runs. By suitably selecting the spring 46, the desired belt tension is maintained at all times upon the belt 30, while the belt is carried clear of all intervening obstructions and easily maintains operative relations between the driving pulley 14 and the driven pulley 25.

In Fig. 5, I have shown one end of the shaft 40 for the pulley 32 as supported in a bearing member 50 slidable on the inner arm of the frame 33. The front end of the member 50 is slotted to receive the stud 34 and is provided with an adjusting screw 51 engaging the front side of said stud. In this way the member 50 may be adjusted along the forked frame 33 and the angular position of the shaft 40 may be varied as found necessary to attain accurate and satisfactory operation of the belt 30.

Although I have shown and described my invention as applied for driving a machine for dusting fruit trees, it will be understood that it is equally well adapted for driving other mechanism similarly located. Many of the advantages of my invention may also be utilized in constructions in which the driven pulley does not rotate about a vertical axis.

A further advantage of my invention lies in the fact that no additional belt tightener is necessary for the dusting machine or other apparatus to which the invention is applied, as the guide pulleys 31 and 32 perform this function also.

Having thus described my invention and the advantages thereof, I do not wish to be limited to the details herein disclosed otherwise than as set forth in the claims, but what I do claim is:—

1. In a tractor, a driving pulley mounted to rotate on an axis parallel to the rear axle of said tractor and forward thereof, an auxiliary mechanism supported at the rear of said tractor and having a rotatably mounted driven pulley, a single belt connecting said driving and driven pulleys, a swinging frame pivoted on said tractor, a guide pulley mounted in said frame and engaging the lower run of said belt, a second guide pulley mounted in an adjustable bearing in the frame, and engaging the upper run of said belt, and a spring effective to swing said frame to increase the tension upon both runs of said belt simultaneously.

2. In a tractor, a driving pulley mounted to rotate on an axis parallel to the rear axle of said tractor and forward thereof, an auxiliary mechanism supported at the rear of said tractor by clamps on the rear axle and having a rotatably mounted driven pulley, a pair of guide pulleys, a swinging supporting frame for said guide pulleys pivoted on said tractor, means to yieldingly tension said swinging frame, and a single belt connecting said driving and driven pulleys, both runs of said belt extending forwardly and upwardly from the driving pulley to said guide pulleys and extending substantially horizontally rearward from said guide pulleys to said driven pulley.

3. A driving attachment as set forth in claim 1, in which the lower guide pulley has its axis substantially parallel to the rear axle of the tractor and the upper guide pulley has its axis inclined to said axle and substantially perpendicular to a line joining said guide pulley to the point on the driven pulley at which the belt leaves said pulley.

4. A driving attachment, as set forth in claim 1, in which the guide pulleys have axes set at an angle to each other.

In testimony whereof I have hereunto affixed my signature.

CLARENCE W. DAYTON.